United States Patent [19]
Borskey

[11] 3,770,314
[45] Nov. 6, 1973

[54] VEHICLE WITH RETRACTABLE AND EXTENSIBLE ROOF ASSEMBLY

[76] Inventor: Charles L. Borskey, P.O. Box 26, Andrews, Ind. 46702

[22] Filed: Apr. 10, 1972

[21] Appl. No.: 242,532

[52] U.S. Cl. .............................. 296/137 B, 296/26
[51] Int. Cl. ............................................. B60j 7/10
[58] Field of Search ..................... 290/137 B, 27, 26

[56] References Cited
UNITED STATES PATENTS

| | | | |
|---|---|---|---|
| 3,212,813 | 10/1965 | Peterson | 296/23 C X |
| 3,514,148 | 5/1970 | Hunter | 296/27 X |
| 2,729,497 | 1/1956 | Runyan | 296/23 C |
| 2,843,418 | 7/1958 | Gray | 296/23 C |

Primary Examiner—Robert R. Song
Attorney—Wilson & Fraser

[57] ABSTRACT

A vehicle with a retractable and extensible roof assembly comprising a ceiling for the vehicle having an opening formed at one end thereof, a load-supporting horizontally slidable closure member adapted to cover the opening in the ceiling, a vertically movable roof portion over the ceiling, movable between a fully extended portion and a retractable portion having flexible sidewalls between the movable roof portion and the ceiling, and spring-biased means for aiding in the elevation of the roof to the fully extended position thereof.

3 Claims, 4 Drawing Figures

PATENTED NOV 6 1973 3,770,314

VEHICLE WITH RETRACTABLE AND EXTENSIBLE ROOF ASSEMBLY

DESCRIPTION OF THE PRIOR ART

With increasing frequency and in greater numbers small buses and vans and similar vehicles have become used, often by families and small groups, in traveling from one part of the country to another, using the vehicle for living quarters at night and during stopovers at vacation and recreation places. These small buses and vans are not of a sufficient height to permit an adult to stand erect or to move comfortably from place to place in the vehicle. Various attempts have been made to make extensible roofs for these vehicles, but the structures resulting from these attempts have been mostly unsatisfactory in that they are often difficult to extend and retract and/or do not become effectively sealed in watertight relationship when folded or retracted. Further, since the extensible and retractable portions are rarely made and installed as part of the original vehicle structure, the units previously used have generally been difficult to install without making substantial changes in the overall top structure of the vehicle.

SUMMARY OF THE INVENTION

It is one of the principle objects of the present invention to provide an extensible and retractable roof for a vehicle which can be readily installed on a conventional vehicle after it has left the manufacturing plant and can easily be operated or manipulated between the folded and unfolded positions without the use of any special tools or equipment.

Another object of the invention is to provide an extensible roof for a vehicle which encloses substantially all of the principal moving parts within the top thereof, and which effectively seals itself in a folded position to prevent water, dirt, grit, and other foreign materials from entering the extensible roof portion of the vehicle.

Still another object of the invention is to provide a compact, relatively simple vehicle extensible roof structure which, when in a folded position, increases the height of the vehicle very little and is compatible with the lines and design of the overall vehicle and which, when in the extended position, can be installed without substantially weakening or altering the structure of the original vehicle top.

A further object of the invention is to provide an extensible roof structure of the aforementioned type which provides adequate room in the vehicle for an adult individual to stand erect and sufficient height in the vehicle to enable the space to be used for storage or as sleeping space when it is in its extended position.

Another object of the invention is to provide an extensible roof which can be fully manufactured apart from the vehicle and shipped, stored and installed without the use of any special tools, equipment, or special skill, and which can be readily constructed using standard, readily available materials.

Another object of the invention is to provide a vehicle having an extensible roof structure which includes a horizontally slidable and hinged closure member which is adapted to selectively close the opening in the vehicle ceiling and provide support for various lengths of mattresses for sleeping purposes when not in use.

BRIEF DESCRIPTION OF THE DRAWINGS

Other objects and advantages of the invention will become readily apparent to those skilled in the art from reading the following detailed description of an embodiment of the invention when considered in the light of the accompanying drawings, in which.

DETAILED DESCRIPTION OF THE PREFERRED EMBODIMENT

Figure 1:
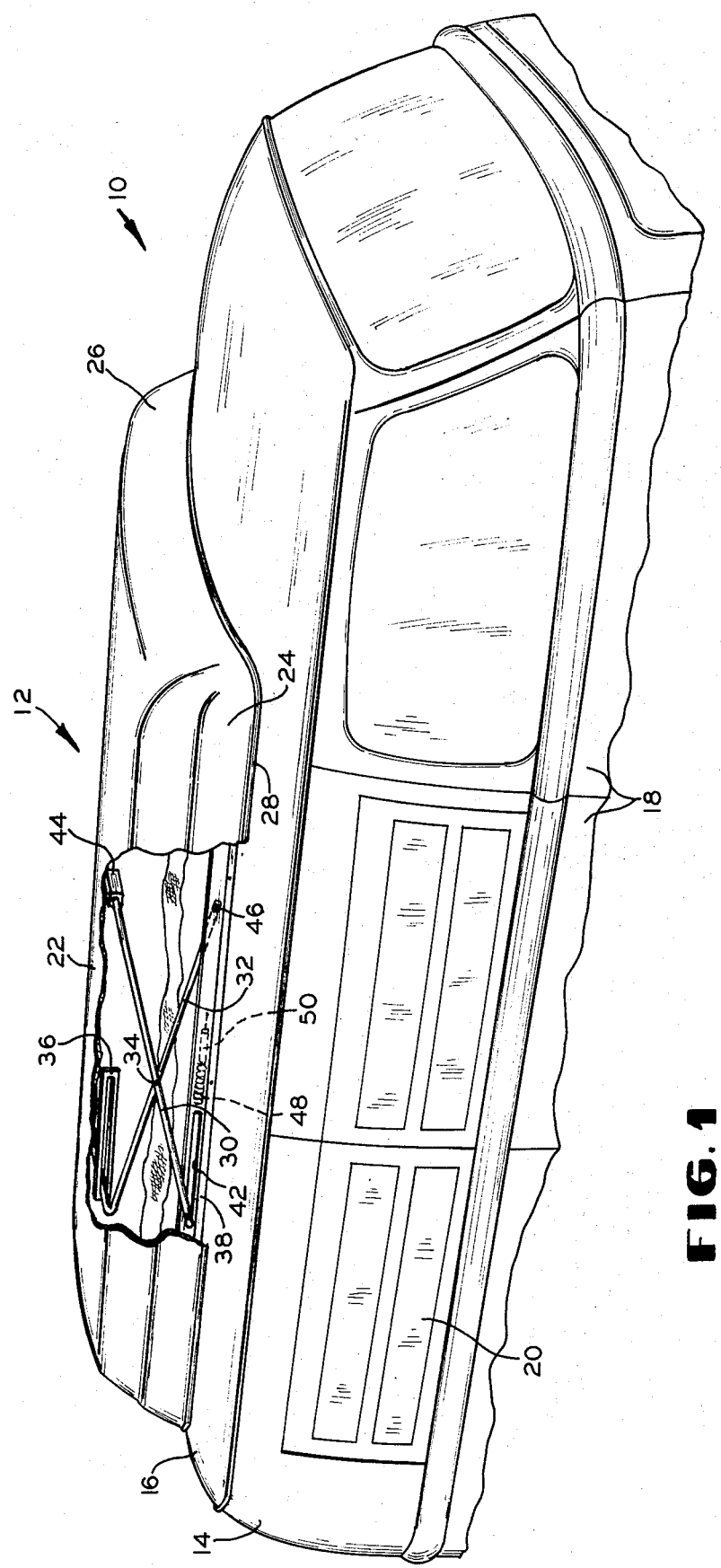
FIG. 1 is a fragmentary perspective view of a vehicle showing the retractable and extensible roof assembly of the invention in a retracted position.
Figure 2:
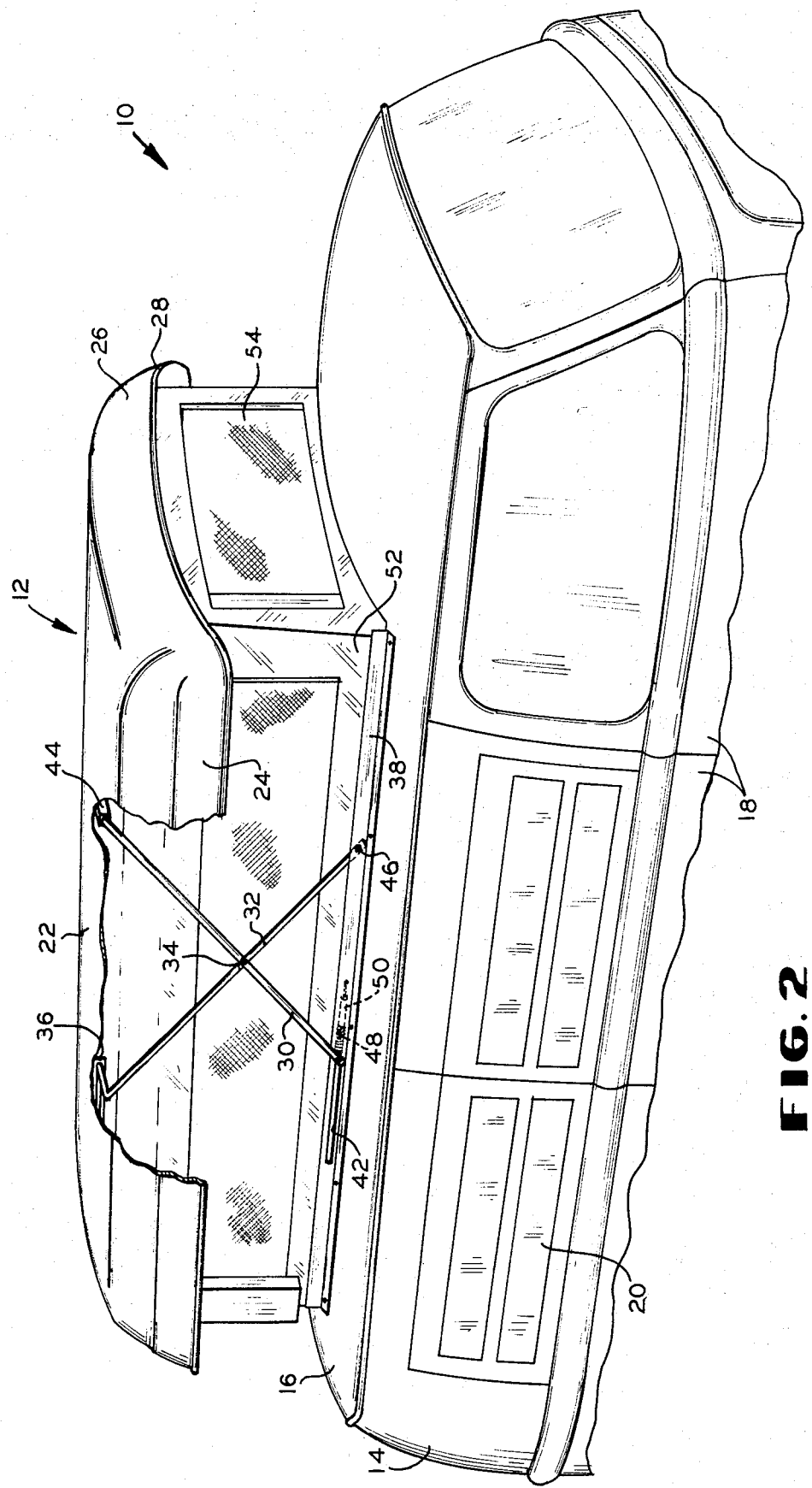
FIG. 2 is a fragmentary perspective view similar to FIG. 1 showing the roof assembly in the extended position.

Referring to the drawings and to FIGS. 1 and 2, in particular, there is shown a vehicle, generally designated by reference numeral 10, on which the present roof 12 is mounted. The vehicle illustrated in the drawings is a small bus which does not have sufficient height between the floor and the ceiling for an adult to stand erect therein. The roof 12 is typically formed of a fiber glass reinforced plastic material which is light in weight, sturdy in construction, resistant to weather, and easy to maintain. The contour of the roof 12 when it is in the retracted or lower position, as illustrated in FIG. 1, presents a low silhouette which is pleasing in appearance and is of acceptable aerodynamic configuration. The type of vehicle on which the roof installation is made is not considered critical so long as the vehicle top construction is such that the present retractable and extensible roof can be mounted thereon. However, it should be noted that the roof of the present invention is particularly adapted to small vehicles which require additional head room for passengers or occupants. These vehicles generally include a body portion 14, a ceiling portion 16, doors 18, a plurality of windows 20, and front and rear ground-engaging wheels not shown.

The retractable and extensible roof 12 consists of a top panel 22, side panels 24 and end panels 26. At the free marginal edges of the side and end panels 24 and 26, respectively, there is provided a molding strip 28 typically formed of an elastomeric material such as rubber, for example, which will effectively create a cushioned seal between the roof 12 and the ceiling portion 16 of the vehicle 10. It will be appreciated that in the position illustrated in FIG. 1, the seal 28 effectively militates against the passage into the interior of the top 12 of water, dirt, grit, and other foreign materials. In order to assist the raising of the roof 12 from the retracted position of FIG. 1 to the extended position of FIG. 2, there is provided a mechanism which includes a pair of crossarms 30 and 32 having their center portions pivotally interconnected as at 34. The crossarms are formed as a U-shaped low member so that their relationship to each other on the one side of the vehicle is the same as their relationship on the other side. The ends of crossarm 32 are pivotally mounted on channel members 38 at 46 while the center of the crossarm is free to slide forward and backward in a pair of guides 36 mounted on the underside of roof 12. The channel members 38 are fixedly engaged to the ceiling portion 16 of the vehicle 10. The lower ends of the crossarm 30 are slidably engaged in slots 42 of the channel members 38. The center of crossarm 30 passes through a pivot and anchor block 44 which is mounted on the underside of roof 12. Thus as the ends of crossarm 30 slide forward and backward in slots 42 the crossarm pivots in block 44. A helical spring means 48 has one end thereof secured to the end of crossarm 30 and the opposite end secured to turnbuckle 50 which is fastened to channel member 38. When the roof 12 is in the lower retracted position of FIG. 1, the spring means 48 is in tension and manifestly will aid in the elevation of the roof 12 to the extended position illustrated in FIG. 2. A similar spring means and turnbuckle are attached to the opposite end of crossarm 30 on the opposite side of the vehicle and the combined strength of the spring means 48 is sufficient to aid in the elevating operation. The turnbuckles 50 are used to adjust the spring tension to the desired level. In order to effect an elevation of the roof 12, the roof must be manually manipulated to the extended position. Upon reaching the full uppermost extended position of the roof 12, the ends of crossarm 30 in the slots 42 fall into suitable notches therein and the roof 12 is retained in the fully extended position. It will be manifest that in order to return the roof to the lower retracted position, the ends of crossarm 30 must be manually removed from the notches in the ends of the slots 42 of channel members 38. As illustrated in FIG. 2 when the roof 12 is in the extended position, side and end flaps 52 and 54 are unfolded and effectively enclose the space between the undersurface of the roof 12 and the upper surface of the ceiling 16 of the vehicle 10. The side and end flaps 52 and 54 are comprised of flexible water repellant material such as canvas, for example, having openings therein covered by a flexible screening material to permit the transmission of both air and light therethrough. The upper marginal edges of the side and end flaps 52 and 54 are typically secured to the inner surface of the roof 12 and the lower edges are suitably secured to the upper surface of the ceiling 16 of the vehicle 10. Thereby, when the roof 12 is lowered to its retracted position, the flexible material of the side and end flaps 52 and 54 fold to a concealed position under the roof 12.

Figure 3:
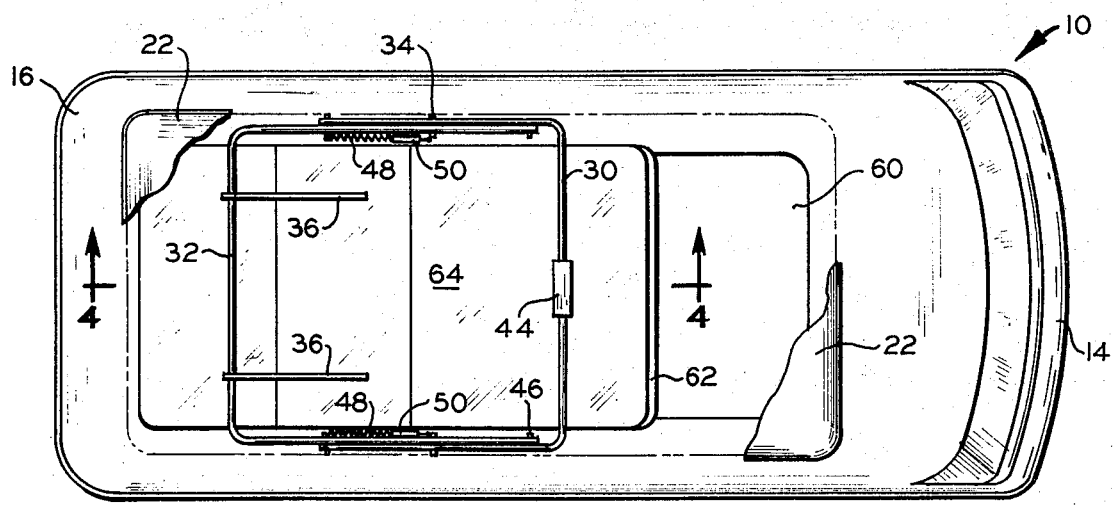
FIG. 3 is a top plan view of the invention illustrated in FIGS. 1 and 2 partially cut away to more clearly illustrate the structure.
Figure 4:
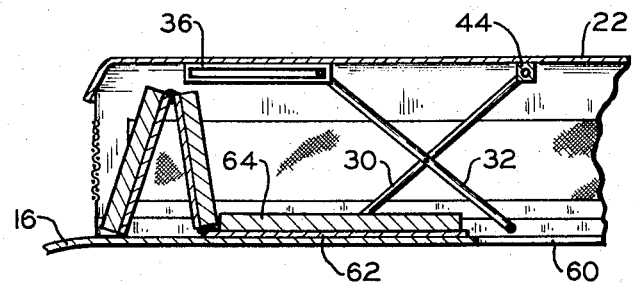
FIG. 4 is a fragmentary elevational sectional view taken along line 4—4 of FIG. 3.

With reference to FIGS. 3 and 4, there is shown an opening 60 formed in the ceiling portion 16 of the vehicle 10 completely covered by the roof 12. The opening 60 is typically formed in the ceiling of the vehicle 10 after manufacture thereof, and at a situs remote from the point where the vehicle was manufactured. The opening 60 provides access from the interior of the vehicle 10 to the space encompassed by the roof 12 and the side and end flaps 52 and 54, respectively, when the roof 12 is in the extended position of FIG. 2. It is through the opening 60 that occupants or passengers of the vehicle 10 may extend the upper portions of their body to obtain full head room in the vehicle to assume an erect position.

Partially covering opening 60 is a slidably disposed mattress support panel 62 comprising three sections connected by hinges. The panel is adapted to be supported on the upper surface of the ceiling portion 16 of the vehicle 10 within the zone defined by the side flaps 52 and the end flaps 54 and is further employed to support a mattress 64 (shown in folded position of nonuse in FIG. 4). When the panel 62 is in the unfolded position illustrated in FIG. 3, the space there above would typically have a composite length adequate to house and support adults. When not in use the panel 62 and the mattress 64 are folded as shown in FIG. 4 to a storage position such that the uncovered portion of opening 60 is effectively increased.

The extensible roof 12 is typically installed on a conventional small bus type vehicle by cutting an aperture or hole in the ceiling portion of the vehicle of the desired size. The marginal edges of the so formed aperture may then be covered by appropriate molding strips to provide a finished appearance thereto. Then the channel members 38 are suitably secured to the upper surface of the ceiling portion 16. When the channel members 38 are secured in place it would be understood that the crossarms 30 and 32 are simultaneously positioned. It will be apparent that the installation is made by the utilization of conventional fastener means such as screws, or nuts and bolts, and that no special tools are required. After the extensible roof structure has been installed on the vehicle 10, the roof 12 can be conveniently extended from the inside of the vehicle by merely pushing upward at the center of crossarm 30 on pivot and anchor block 44. As the roof 12 is lifted, the side and end flaps 52 and 54 are brought under some tension until they are completely unfolded from their normally folded position when the roof is in a retracted position. After the roof 12 has been lifted to its fully extended position, it is locked in this position by the ends of the crossarm 30 being positioned in the respective notches of slots 42. When it is desired to retract the roof 12, the ends of the crossarm 30 are removed from the notches at the ends of the slots 42 and the weight of the roof is typically sufficient to return the entire structure to its retracted position. As the roof 12 is retracting, the side and end panels 52 and 54 are folded to be completely concealed within the interior of the roof 12 in a protected position.

While mention has been made in the foregoing description of the employment 8 of notches for retention of the linkage members, it will be understood that the notches are not deemed necessary. The bias of the respective spring elements and/or the weight of the roof structure will cooperate to retain the linkages in the desired positions.

It will be appreciated from the foregoing that the assembly illustrated and described has produced a relatively simple means for raising and lowering the retractable and extensible roof from only a single location.

A particular advantage of the assembly resides in the requirement for only a single latching or locking mechanism in the region of the front end panel 26 of roof 12 to lock the same, in its lowered position, to the vehicle 10. The linkage mechanism is such that when the front panel is suitably locked, the rear end of the roof, although not specifically locked, cannot be raised.

The description has pointed out the structural and functional aspects of the crossarm 30 for purposes of roof support and its use in the raising and lowering of the roof, but it must also be realized that the crossarm 30 provides a member which may be grasped to effectively manipulate the assembly.

In accordance with the provisions of the patent statutes, I have explained the principle and mode of operation of my invention and have illustrated and described what I now consider to represent its best embodiment. However, it is to be understood that within the spirit and scope of the oppended claims the invention may be practiced otherwise than as specifically illustrated and described.

What I claim is:

1. A vehicle having a passenger compartment and a retractable roof assembly including a ceiling structure for the vehicle having an aperture formed therein providing communication with the passenger compartment of the vehicle, and a roof disposed in superposed relation over said ceiling structure and covering the aperture in said ceiling structure, the improvement comprising: means for selectively extending and retracting said roof structure, said means including a first and second inverted U-shaped bow member, first guide means attached to said ceiling structure, second guide means attached to said roof structure, said first bow member having its upper portion pivotally connected to said roof and its lower ends connected to said first guide means for permitting guided horizontal movement of said lower ends along said ceiling structure, said second bow member having its upper portion connected to said second guide means for permitting guided horizontal movement of said upper portion along said roof and its lower ends pivotally connected to said ceiling structure, and means for pivotally interconnecting the side portions of said first bow member to the respective side portions of said second bow member.

2. The invention claimed in claim 1 including biassing means for assisting the extension of said roof structure to its fully extended position, said biassing means comprising a helical spring and adjustable turnbuckle said spring being interconnected between the lower end of said first bow member and said ceiling structure whereby said spring is under tension when the roof structure is in a retracted position.

3. The invention claimed in claim 1 including an extendable horizontally disposed body-supporting panel of hinged segments including means for guiding the slidable movement thereof, to positions of selected closure for the aperture in said ceiling structure; whereby when said roof is moved to an extended position over said ceiling structure and said body-supporting panel is moved to an unfolded position, sufficient room is provided for at least one individual to enter through the aperture in said ceiling and recline in the zone defined by said roof and said ceiling structure and said body-supporting panel.

* * * * *